United States Patent
Kaplinsky

(10) Patent No.: US 7,543,327 B1
(45) Date of Patent: Jun. 2, 2009

(54) VIDEO SURVEILLANCE SYSTEM BASED ON HIGH RESOLUTION NETWORK CAMERAS CAPABLE OF CONCURRENT TRANSMISSION OF MULTIPLE IMAGE FORMATS AT VIDEO RATES

(75) Inventor: Michael Kaplinsky, Sierra Madre, CA (US)

(73) Assignee: Arecont Vision LLC, Glendale, CA (US)

( * ) Notice: Subject to any disclaimer, the term of this patent is extended or adjusted under 35 U.S.C. 154(b) by 546 days.

(21) Appl. No.: 10/994,643

(22) Filed: Nov. 22, 2004

Related U.S. Application Data

(60) Provisional application No. 60/524,490, filed on Nov. 21, 2003, provisional application No. 60/524,449, filed on Nov. 21, 2003, provisional application No. 60/524,448, filed on Nov. 21, 2003, provisional application No. 60/524,488, filed on Nov. 21, 2003.

(51) Int. Cl.
*H04N 7/173* (2006.01)
*H04N 5/232* (2006.01)
*H04N 7/18* (2006.01)
*H04N 5/225* (2006.01)

(52) U.S. Cl. .................. 725/105; 348/211.5; 348/143; 348/207.1

(58) Field of Classification Search ............ 348/211.3, 348/211.5, 218.1, 211.12, 211.13, 211.11, 348/333.11
See application file for complete search history.

(56) References Cited

U.S. PATENT DOCUMENTS

| | | | | |
|---|---|---|---|---|
| 4,789,894 | A * | 12/1988 | Cooper | 348/155 |
| 5,745,161 | A * | 4/1998 | Ito | 348/14.09 |
| 5,754,230 | A * | 5/1998 | Tsuruta | 348/333.12 |
| 6,911,999 | B2 * | 6/2005 | Sasaki | 348/211.6 |
| 7,071,971 | B2 * | 7/2006 | Elberbaum | 348/211.11 |
| 7,123,302 | B2 * | 10/2006 | Shiohara | 348/308 |
| 7,298,409 | B1 * | 11/2007 | Misawa | 348/333.01 |
| 7,397,958 | B2 * | 7/2008 | Le Leannec et al. | 382/233 |
| 2003/0117500 | A1 * | 6/2003 | Lin | 348/211.3 |
| 2004/0066457 | A1 * | 4/2004 | Silverstein et al. | 348/211.3 |

* cited by examiner

*Primary Examiner*—David L Ometz
*Assistant Examiner*—Luong T Nguyen
(74) *Attorney, Agent, or Firm*—Christie, Parker & Hale, LLP.

(57) ABSTRACT

A video system including one or more high resolution network video cameras, a computer and a monitor. The video cameras are capable of simultaneously generating a full field of view reduced-resolution of an image and a full-resolution sub-window of the image. The computer is configured to receive images from the video cameras via a computer network and display the images on the monitor in which a full field view of the image and a sub-window of the image are displayed on the monitor simultaneously.

18 Claims, 3 Drawing Sheets

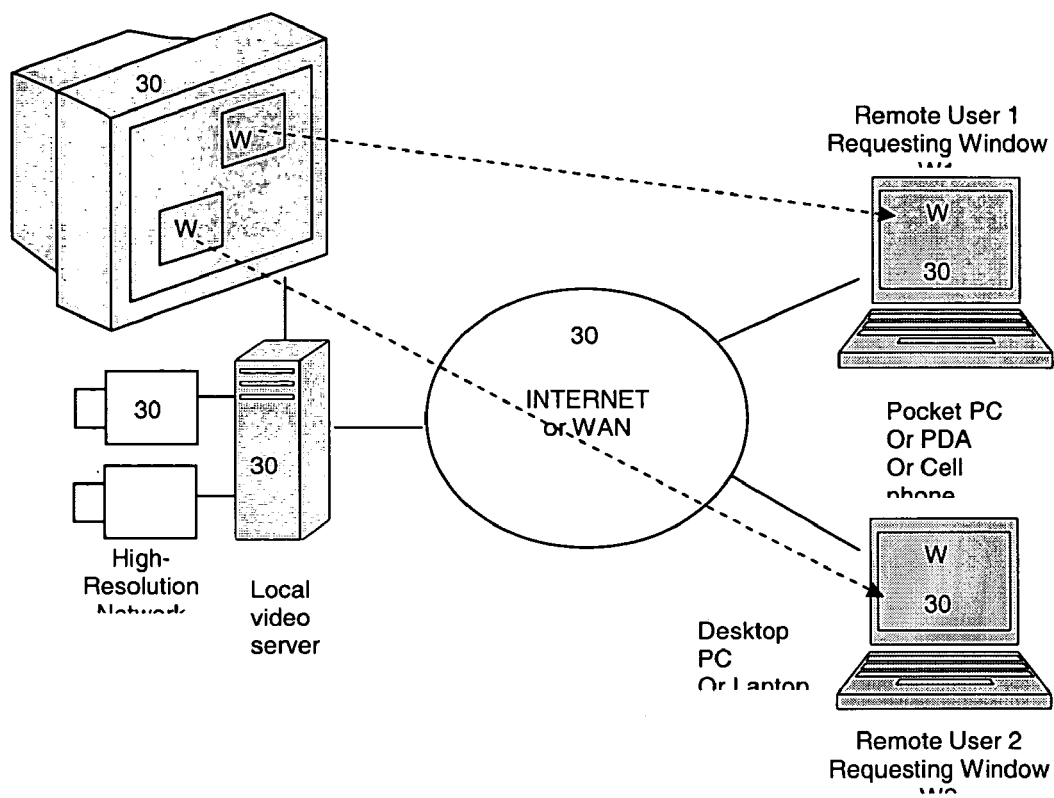
Figure 3. Block Diagram of Video System Based on High Resolution Network Cameras

VIDEO SURVEILLANCE SYSTEM BASED ON HIGH RESOLUTION NETWORK CAMERAS CAPABLE OF CONCURRENT TRANSMISSION OF MULTIPLE IMAGE FORMATS AT VIDEO RATES

CROSS REFERENCE TO RELATED APPLICATIONS

This application claims the benefit of U.S. Provisional Application Nos. 60/524,490 filed Nov. 21, 2003, 60/524,449 filed Nov. 21, 2003, 60/524,448 filed Nov. 21, 2003, and 60/524,488 filed Nov. 21, 2003, the contents of which are incorporated by reference herein.

Also incorporated by reference herein are the following applications which were filed on Jul. 14, 2004: Ser. Nos. 10/890,870, 10/890,911, 10/890,912, 10/890,913, 10/890,914 and 10/890,915.

Also incorporated by reference herein are the following applications filed on even date herewith:

| Title | Priority Application |
|---|---|
| HIGH RESOLUTION NETWORK VIDEO CAMERA WITH MASSIVELY PARALLEL IMPLEMENTATION OF IMAGE PROCESSING, COMPRESSION AND NETWORK SERVER | 60/524,449 |
| METHOD FOR ACCURATE REAL-TIME COMPENSATION FOR CHANGING ILLUMINATION SPECTRA IN DIGITAL VIDEO CAMERAS | 60/524,488 |

BACKGROUND

Most currently installed video surveillance systems are based on NTSC/PAL/SECAM analog video cameras with camera resolution rigidly fixed by the corresponding video standard. Thus, to inspect fine detail of the scene, NTSC surveillance systems have to rely on expensive optical zoom. However, higher optical zoom inevitably corresponds to reduced field of view of the camera, requiring the operator to make a choice between higher level of detail and higher coverage of the area under surveillance.

On the other hand, leveraging high-speed LAN infrastructures and employing high resolution (multi-megapixel) network cameras in video surveillance allows to avoid many of the shortcomings associated with low resolution NTSC cameras. Network video cameras rely on packet-oriented digital image transmission are not limited to any particular image resolution and frame rate. This opens the door for the development of high-resolution video surveillance systems that are overall superior to existing NTSC systems and provide video-rate multi-format functionality previously unavailable in video surveillance.

SUMMARY

Present invention discloses a number of modes of operation of video surveillance system based on previously disclosed by the author network cameras with massively parallel image processing, compression and network server.

The subject of the present invention is video surveillance system that comprises a number of high resolution network video cameras, wherein all or some of said cameras are capable of concurrent transmission of multiple image formats at video rates, common to these cameras video server/computer and system-level software, wherein said server is configured to acquire the images from said cameras, to store said images in digital archives, to display said images on one or more monitors and to respond to the requests of local and remote users by sending to said users requested images over local or wide area networks.

The other subject of the present invention is video system comprising one or more high resolution network video cameras, computer and monitor, wherein said computer is configured to receive images from said video cameras by means of computer network and wherein said computer is configured to display said images on said computer monitor and wherein said display of said images comprises display mode wherein full field of view image and a sub-window of said image are displayed on said monitor simultaneously.

The third subject of the present invention is video system comprising one or more high resolution network video cameras, computer and monitor, wherein said computer is configured to receive images from said video cameras by means of computer network and wherein said computer is configured to concurrently transmit different segments of said images to one or more remote users by means of computer network and wherein two or more of said remote users may request and receive distinctly different segments or sub-windows of said images.

BRIEF DESCRIPTION OF DRAWINGS

FIG. 3 depicts block-diagram of video system based on high resolution network cameras.

DETAILED DESCRIPTION

Present invention discloses video surveillance system comprising previously disclosed by the author network cameras with massively parallel image processing, compression and network server.

The subject of the present invention is video surveillance system that comprises a number of high resolution network video cameras, wherein all or some of said cameras are capable of concurrent transmission of multiple image formats at video rates, common to these cameras video server/computer and system-level software, wherein said server is configured to acquire the images from said cameras, to store said images in digital archives, to display said images on one or more monitors and to respond to the requests of local and remote users by sending to said users requested images over local or wide area networks. FIG. 3 depicts block-diagram of video system based on high resolution network cameras.

Figure 2:
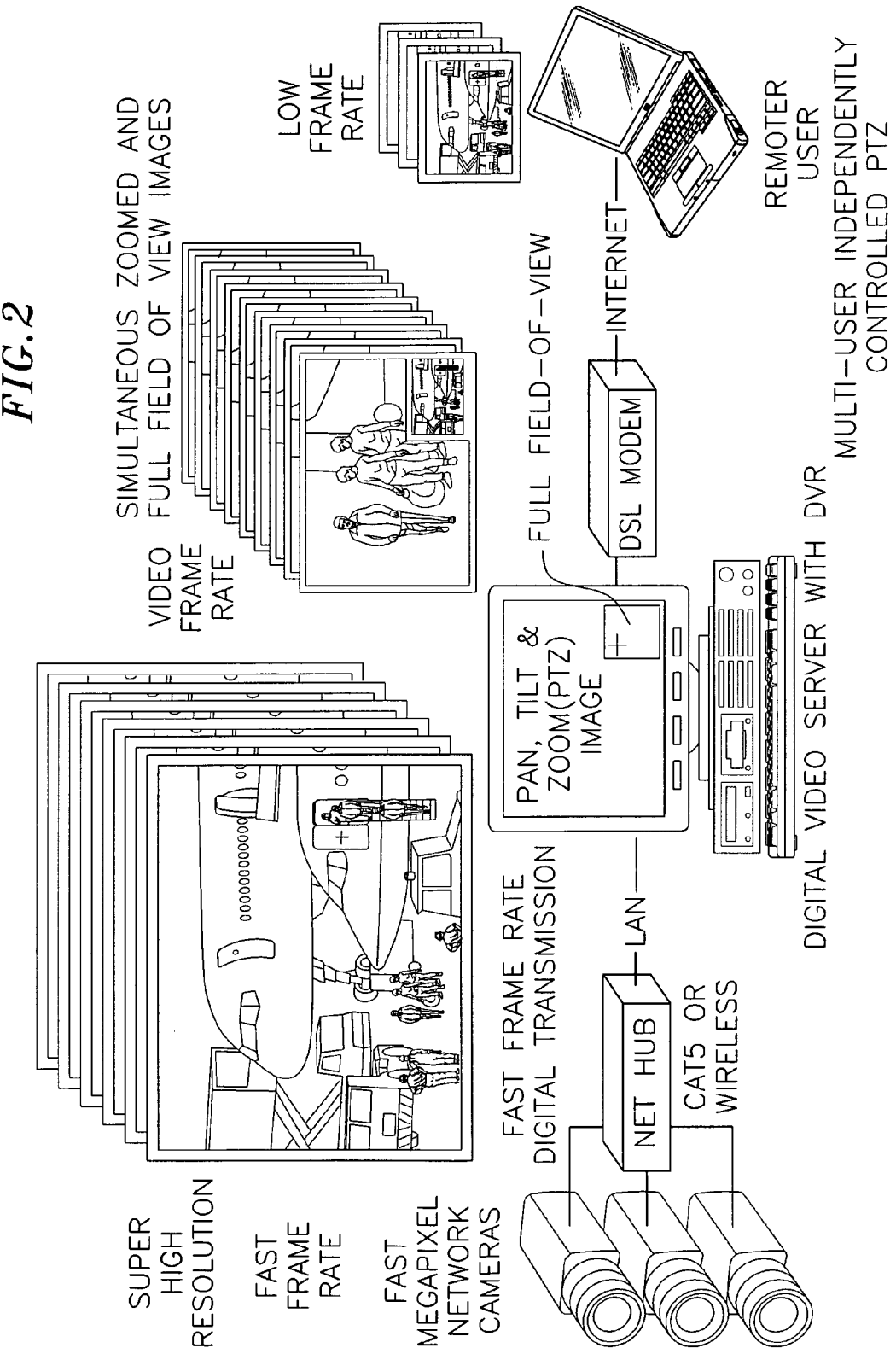
FIG. 2 depicts an illustration of some of the operational modes of the system disclosed in the present invention.
Figure 2:
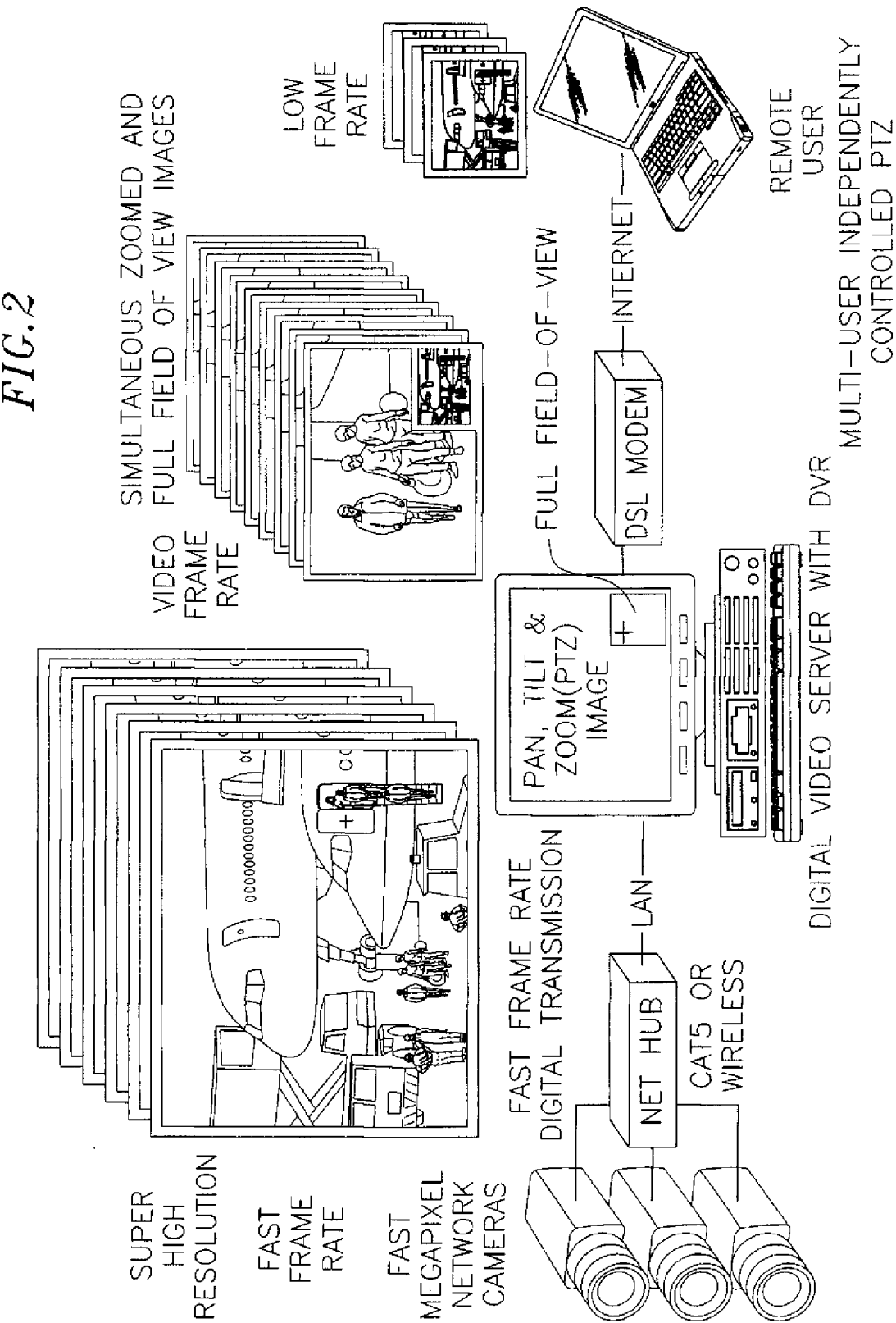

The other subject of the present invention is video system comprising one or more high resolution network video cameras, computer and monitor, wherein said computer is configured to receive images from said video cameras by means of computer network and wherein said computer is configured to display said images on said computer monitor and wherein said display of said images comprises display mode wherein full field of view image and a sub-window of said image are displayed on said monitor simultaneously. FIG. 2 depicts an illustration of some of the operational modes of the system disclosed in the present invention.

Figure 1:
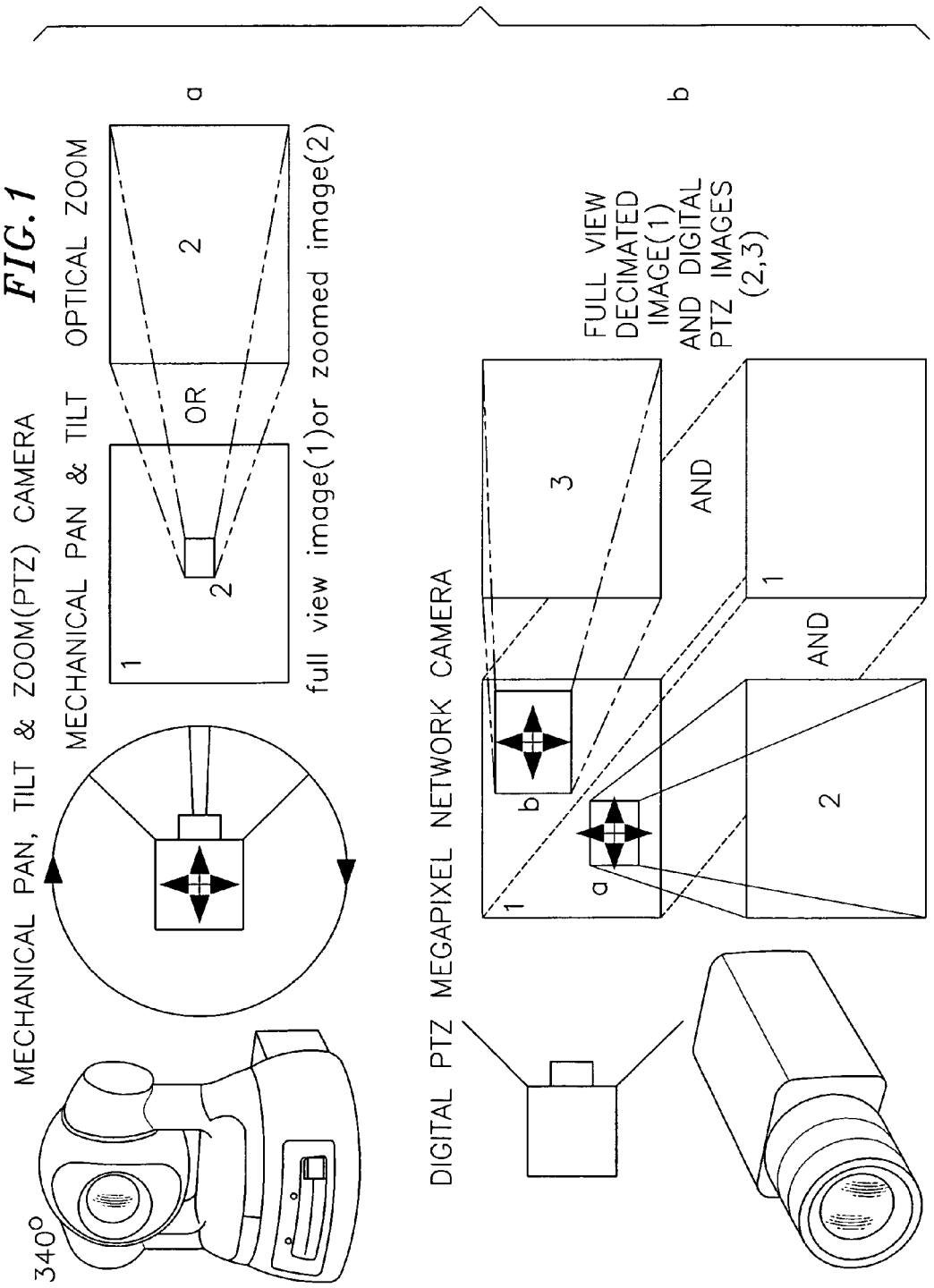
FIG. 1 depicts multi-user digital pan, tilt and zoom enabled by high-resolution network cameras.

The third subject of the present invention is video system comprising one or more high resolution network video cameras, computer and monitor, wherein said computer is configured to receive images from said video cameras by means of computer network and wherein said computer is configured to concurrently transmit different segments of said images to one or more remote users by means of computer network and wherein two or more of said remote users may request and receive distinctly different segments or sub-windows of said images. FIG. 1 depicts multi-user digital pan, tilt and zoom enabled by high-resolution network cameras.

In the preferred embodiment of the present invention, network cameras are based on image sensors capable of generating high resolution images at video rates, dedicated image processing pipeline capable of performing image processing at the speed of operation of the image sensor, image buffer memory for storing full resolution processed images and network interface with sufficient bandwidth to support video rate transmission of generated video.

In the preferred embodiment of the present invention, to reduce operation computational resources and network bandwidth, the cameras are capable of simultaneous generation and transmission of full field of view reduced-resolution (decimated) images along with the specified full resolution regions or sub-windows of the image. To achieve this capability, the cameras scan their image buffer memory repeatedly, forming requested images and transmitting them over network either using multiple logical connections or sequentially transmitting multiple image formats back-to-back over single logical connection.

In the preferred embodiment of the present invention multiple cameras are connected to a video server common to them, where said server represents a computer configured to execute system-level surveillance software and wherein said server/computer is also configured to perform real-time decompression of all or some of the incoming video streams and to display said video streams on high-resolution local monitor as well as on TV monitors connected to its output video device via appropriate modulators/interfaces.

In the preferred embodiment of the present invention, the surveillance system is configured to overlay full field of view reduced resolution decimated video images with full-resolution image sub-windows or rectangular image regions, wherein resulting composite image forms picture-in-picture (PIP) arrangement, wherein said composite image primarily consists of zoomed portion of full filed of view image with the second image overlaid in the corner of the main image. In the preferred embodiment of the present invention, said composite image is either displayed on the local monitor or modulated on the TV channel allowing simultaneous observation of high resolution (zoomed) portion of the image together with full field of view (possibly decimated) image on the same monitor. This mode of system operation avoids the shortcomings of low-resolution systems where the user has to choose between full field of view and zoomed imagery.

In one of the embodiments of the present invention, video server acquires from connected to it cameras complete full resolution images and processes them to produce picture-in-picture display image described above. In another embodiment of the present invention, the cameras simultaneously deliver full field of view images and full resolution image sub-windows. The potential advantage of this mode of operation may be illustrated by considering formation of NTSC image comprising 720×480 full resolution sub-window of full 1600×1200 camera image overlaid with 160×120 decimated full field of view image. If this image is formed on the server, then entire 1600×1200 image needs to be transmitted off camera. On the other hand only two images 640×480 and 160×120, respectively need to be transmitted concurrently off camera if the images can be formed in the camera, resulting in over 600% savings of network bandwidth.

In the preferred embodiment of the present invention the surveillance system is configured to support multiple user-selectable modes of image acquisition and display, wherein said modes comprise full resolution image display, simultaneous display of multiple decimated images acquired from different cameras on the same monitor, and picture-in-picture display of zoomed (windowed) and full-field-of-view video acquired from the same camera on the same monitor.

In one of the embodiments of the present invention three image formats are simultaneously transmitted off camera, wherein said image formats comprise reduced resolution decimated full field of view images, full resolution windowed images and an entire full resolution complete image, wherein first two image formats are transmitted at video frame rate for picture-in-picture display, while later format is transmitted at much slower rate, wherein full resolution complete image is stored in video archives and also provides the means for remote system users to gain independent access to pan, tilt and zoom capabilities, wherein said remote users request from the server and receive over the network of image sub-windows, wherein the system is configured to deliver to each remote user the images of specific size and resolution as requested by each said user.

To achieve real-time display of compressed video acquired from high-resolution network cameras the receiving computer first decompresses the acquired video streams. For sufficiently high camera resolution and frame rate, the update rate of the display may become slower than the frame-rate of said cameras due to CPU limitations and high computational complexity of said image decompression. In one of the embodiments of the present invention, the computer acquiring images from said high resolution cameras comprises an Ethernet network interface adapter (network card) wherein said network interface adapter comprises on-board real-time video decompression and direct memory access (DMA) engines. In this later embodiment said network adapter is configured to decompress acquired from said cameras images into bitmaps and to directly place said bitmaps in the computer memory, thus reducing CPU load.

In the preferred embodiment of the present invention said server/computer is also capable of servicing requests from local and remote users for the access to the specific parts of the system imagery. In the preferred embodiment, the requests from the remote user may specify resolution and size and position of image sub-window, that is then delivered to said user over local or wide area network. In the preferred embodiment of the present invention system server comprises the means for de-compressing, decimating and windowing acquired images, re-compressing said windowed or decimated images and sending said images to said remote users by means of standard network protocols such as TCP/IP. This capability allows multiple system users to gain simultaneous access to individual windows of interest by specifying their own pan, tilt and zoom (PTZ) settings of the camera. This presents a drastic contrast with optical zoom and mechanical pan and tilt wherein only one user can be in control of the camera at any given time.

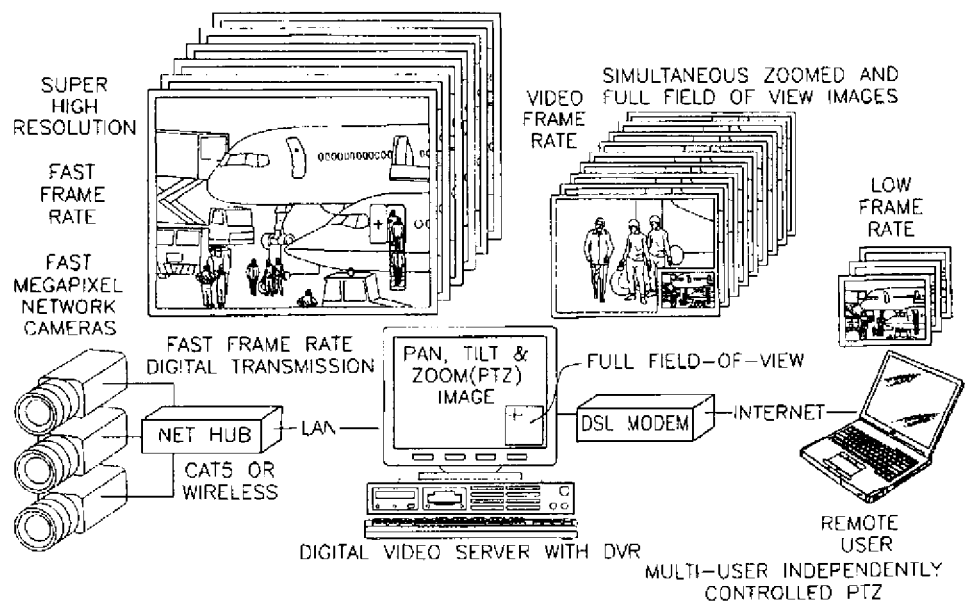

What is claimed as new and desired to be protected by Letters of Patent of the United States is:

1. Video system comprising:
   a network video camera including an image buffer memory for storing video images at a video rate, and electrically coupled to a computer network, wherein said video camera is capable of repeatedly scanning said image buffer memory at said video rate, decimating an image from said image buffer memory, and substantially simultaneously generating a full field of view reduced-resolution of said image responsive to the decimating the image, and a full-resolution sub-window of said image;

a computer electrically coupled to said computer network; and a monitor electrically coupled to the computer, wherein said computer is configured to receive said full field of view reduced-resolution and said full-resolution sub-window of said image from said video camera via the computer network and display said full field of view reduced-resolution and said full-resolution sub-window on said monitor, wherein said full field of view reduced-resolution of said image and said full-resolution sub-window of said image are displayed on said monitor simultaneously.

2. Video system of claim 1, wherein said video camera is high resolution video camera comprising more than 1 million pixels.

3. Video system of claim 1, wherein said simultaneous display of full field of view reduced-resolution and said full-resolution sub-window of said image are displayed as a composite picture-in-picture (PIP) image.

4. Video system of claim 3, wherein said composite picture-in-picture (PIP) image is configured to comprise the full field of view reduced-resolution of said image and zoomed segment of said image.

5. Video system of claim 2, wherein said simultaneous display of full field of view reduced-resolution of said image is an image of lower resolution than the resolution of said video camera originating said image.

6. Video system of claim 2, wherein said monitor has lower resolution than the resolution of the said video camera.

7. Video system of claim 1, wherein said computer is configured to reduce the resolution of images acquired from said video camera.

8. Video system of claim 1, wherein said computer is configured to extract an image segment or image sub-window from the image acquired from said video camera.

9. Video system of claim 1, wherein said video camera are equipped to modify resolution of the images output from said video camera.

10. Video system of claim 1, wherein said full field of view reduced-resolution and said full-resolution sub-window of said image are received from said video camera by multiple logical network connections or by interleaving multiple image formats on a frame-by-frame basis.

11. Video system comprising:
a network video camera electrically coupled to a computer network for capturing, decimating, and transmitting a video image via the computer network; and
a computer electrically coupled to said computer network, wherein said computer is configured to receive said video image from said video camera via the computer network and to transmit different segments of the same received video image having specific respective sizes and resolutions to different remote users, respectively, via the computer network in substantially real-time, based on respective requests from said different remote users.

12. Video system of claim 11, wherein said video camera is a high resolution video camera comprising more than 1 million pixels.

13. Video system of claim 11, wherein said computer is configured to receive and process requests from said remote users, wherein said requests comprise the description of the resolution, size and position of respective sub-windows to include a respective video image.

14. Video system of claim 11, wherein said computer is configured to extract an image segment or image sub-window from the image acquired from said video camera.

15. Video system of claim 11, wherein said video camera is equipped to modify resolution of the images output from said video camera.

16. Video system of claim 11, wherein said video camera is equipped to output full field of view images and image sub-windows simultaneously, wherein said simultaneous output is performed by multiple logical network connections or by interleaving multiple image formats on a frame-by-frame basis.

17. Video system of claim 1, wherein said video camera is further capable of simultaneously generating a full field of view full-resolution of said video image.

18. Video system of claim 11, wherein said video camera includes an image buffer memory and is capable of repeatedly scanning its image buffer memory to simultaneously generating a full field of view reduced-resolution of an image, a full field of view full-resolution of said image, and a full-resolution sub-window of said image.

* * * * *

UNITED STATES PATENT AND TRADEMARK OFFICE
CERTIFICATE OF CORRECTION

PATENT NO. : 7,543,327 B1  Page 1 of 3
APPLICATION NO. : 10/994643
DATED : June 2, 2009
INVENTOR(S) : Michael Kaplinsky It is certified that error appears in the above-identified patent and that said Letters Patent is hereby corrected as shown below:

Delete the title page showing an illustrative figure and substitute the attached title page therefore.

In the Drawings
FIG. 2, Sheet 2 of 3          Delete Drawing Sheet 2 and substitute therefore the Drawing
                              Sheet, consisting of FIG 2, as shown on the attached page

In the Claims
Column 5, Claim 2, line 18    Insert --a-- before "high"

Column 5, Claim 9, line 40    Delete "are"
                              Insert --is--

Column 6, Claim 18, line 40   Delete "generating"
                              Insert --generate--

Signed and Sealed this
Twentieth Day of March, 2012

David J. Kappos
*Director of the United States Patent and Trademark Office*

(12) United States Patent
Kaplinsky

(10) Patent No.: US 7,543,327 B1
(45) Date of Patent: Jun. 2, 2009

(54) VIDEO SURVEILLANCE SYSTEM BASED ON HIGH RESOLUTION NETWORK CAMERAS CAPABLE OF CONCURRENT TRANSMISSION OF MULTIPLE IMAGE FORMATS AT VIDEO RATES

(75) Inventor: Michael Kaplinsky, Sierra Madre, CA (US)

(73) Assignee: Arecont Vision LLC, Glendale, CA (US)

(*) Notice: Subject to any disclaimer, the term of this patent is extended or adjusted under 35 U.S.C. 154(b) by 546 days.

(21) Appl. No.: 10/994,643

(22) Filed: Nov. 22, 2004

Related U.S. Application Data

(60) Provisional application No. 60/524,490, filed on Nov. 21, 2003, provisional application No. 60/524,449, filed on Nov. 21, 2003, provisional application No. 60/524,448, filed on Nov. 21, 2003, provisional application No. 60/524,488, filed on Nov. 21, 2003.

(51) Int. Cl.
  *H04N 7/173* (2006.01)
  *H04N 5/232* (2006.01)
  *H04N 7/18* (2006.01)
  *H04N 5/225* (2006.01)

(52) U.S. Cl. .................. 725/105; 348/211.5; 348/143; 348/207.1

(58) Field of Classification Search .......... 348/211.3, 348/211.5, 218.1, 211.12, 211.13, 211.11, 348/333.11
See application file for complete search history.

(56) References Cited

U.S. PATENT DOCUMENTS

| | | | | |
|---|---|---|---|---|
| 4,789,894 A | * | 12/1988 | Cooper | 348/155 |
| 5,745,161 A | * | 4/1998 | Ito | 348/14.09 |
| 5,754,230 A | * | 5/1998 | Tsuruta | 348/333.12 |
| 6,911,999 B2 | * | 6/2005 | Sasaki | 348/211.6 |
| 7,071,971 B2 | * | 7/2006 | Elberbaum | 348/211.11 |
| 7,123,302 B2 | * | 10/2006 | Shiohara | 348/308 |
| 7,298,409 B1 | * | 11/2007 | Misawa | 348/333.01 |
| 7,397,958 B2 | * | 7/2008 | Le Leannec et al. | 382/233 |
| 2003/0117500 A1 | * | 6/2003 | Lin | 348/211.3 |
| 2004/0066457 A1 | * | 4/2004 | Silverstein et al. | 348/211.3 |

\* cited by examiner

*Primary Examiner*—David L Ometz
*Assistant Examiner*—Luong T Nguyen
(74) *Attorney, Agent, or Firm*—Christie, Parker & Hale, LLP.

(57) ABSTRACT

A video system including one or more high resolution network video cameras, a computer and a monitor. The video cameras are capable of simultaneously generating a full field of view reduced-resolution of an image and a full-resolution sub-window of the image. The computer is configured to receive images from the video cameras via a computer network and display the images on the monitor in which a full field view of the image and a sub-window of the image are displayed on the monitor simultaneously.

18 Claims, 3 Drawing Sheets